(12) United States Patent
Haspert et al.

(10) Patent No.: US 12,518,870 B2
(45) Date of Patent: Jan. 6, 2026

(54) SYSTEMS AND METHODS FOR ANALYZING MULTIPLE VARIABLES IN DYNAMIC RESOURCE DISTRIBUTION

(71) Applicant: Centene Corporation, Saint Louis, MO (US)

(72) Inventors: Timothy J. Haspert, Western Springs, IL (US); Kyle Schenthal, Saint Louis, MO (US); Ross Creager, Saint Louis, MO (US)

(73) Assignee: Centene Corporation, Saint Louis, MO (US)

( * ) Notice: Subject to any disclaimer, the term of this patent is extended or adjusted under 35 U.S.C. 154(b) by 740 days.

(21) Appl. No.: 17/183,188

(22) Filed: Feb. 23, 2021

(65) Prior Publication Data

US 2021/0265065 A1    Aug. 26, 2021

Related U.S. Application Data

(60) Provisional application No. 62/980,891, filed on Feb. 24, 2020.

(51) Int. Cl.
*G06Q 10/0631* (2023.01)
*G16H 40/20* (2018.01)

(52) U.S. Cl.
CPC ..... *G16H 40/20* (2018.01); *G06Q 10/063112* (2013.01); *G06Q 10/063116* (2013.01)

(58) Field of Classification Search
CPC .......... G16H 40/20; G06Q 10/063112; G06Q 10/063116
USPC ............................................................. 705/2
See application file for complete search history.

(56) References Cited

U.S. PATENT DOCUMENTS

| | | |
|---|---|---|
| 8,019,622 B2 | 9/2011 | Kaboff et al. |
| 10,460,408 B2 | 10/2019 | Gajic et al. |
| 10,474,971 B2 | 11/2019 | Olsen et al. |
| 2005/0131740 A1 | 6/2005 | Massenzio et al. |
| 2006/0053035 A1 | 3/2006 | Eisenberg |
| 2009/0204434 A1* | 8/2009 | Breazeale, Jr. .......... G07C 1/10 705/2 |
| 2010/0145723 A1 | 6/2010 | Hudson et al. |
| 2012/0125168 A1 | 5/2012 | O'Keefe |

(Continued)

OTHER PUBLICATIONS

PCT International Search Report and Written Opinion, Application No. PCT/US2021/019301, dated May 10, 2021, 13 pps.

*Primary Examiner* — Reginald R Reyes
(74) *Attorney, Agent, or Firm* — Armstrong Teasdale LLP

(57) ABSTRACT

A caregiver assignment (CA) computing system is described. The CA computing system includes a processor coupled to a database. The processor is configured to receive caregiver data and convert the caregiver data into a shared format, the converted caregiver data including an indication of the current workload for the at least one caregiver. The processor is also configured to receive patient data associated with a patient, determine care data from the patient data, the care data including an estimated amount of time required to administer care to the patient, and convert the care data into the shared format, the converted care data indicating the estimated amount of time required to administer care to the patient. The processor is further configured to automatically generate, based at least upon the converted caregiver data and the converted care data, an assignment of a caregiver of the plurality of caregivers to the patient.

18 Claims, 8 Drawing Sheets

(56) References Cited

U.S. PATENT DOCUMENTS

| | | |
|---|---|---|
| 2012/0197662 A1 | 8/2012 | Sun et al. |
| 2012/0253836 A1 | 10/2012 | Nolte et al. |
| 2017/0140112 A1 | 5/2017 | Wager |
| 2018/0330814 A1 | 11/2018 | Auer et al. |
| 2019/0065970 A1* | 2/2019 | Bonutti .............. A61N 1/36514 |
| 2019/0122760 A1 | 4/2019 | Wang |

* cited by examiner

SYSTEMS AND METHODS FOR ANALYZING MULTIPLE VARIABLES IN DYNAMIC RESOURCE DISTRIBUTION

CROSS-REFERENCE TO RELATED APPLICATIONS

This application claims priority to U.S. Patent Application No. 62/980,891, filed Feb. 24, 2020, which is hereby incorporated herein by reference.

BACKGROUND

The field of this disclosure relates generally to distribution of resources and, more specifically, to network-based systems and methods for analyzing multiple variables with different weighting factors in determining an efficient distribution of resources over a geographic area and time period.

In order to distribute resources efficiently, many variables need to be considered. As examples, resources themselves may have variable capacities for completing work and recipients of resources may have resource preferences. Further, different entities may implement certain requirements regarding which resources are qualified to complete which tasks. While an optimal recommendation regarding distribution of resources may be requested, oftentimes pluralities of options regarding distribution of resources are desired.

For example, many healthcare caregiving providers use case managers (e.g., program coordinators) to manually assign caregivers to patients, involving a very labor-intensive process of viewing new patient reports and trying to match the new patients with the appropriate caregivers. Caregivers are often assigned by case managers to patients in order to provide physical care and/or emotional support to patients who, in some cases, can no longer care for themselves due to illness, injury, and/or disability. Oftentimes caregivers are merely assigned to patients based on locations assigned to a caregiver (e.g., caregivers are assigned to zip codes and are responsible for all patients in those zip codes). However, there are many factors that may be relevant to efficiently assigning caregivers to patients, rather than just locations assigned to a caregiver. These factors may go undetected by a human merely reviewing the data. Moreover, in some cases, multiple factors or combinations of factors may be important to efficiently assigning caregivers to patients. Thus, more sophisticated and automated systems and methods are desired for efficiently and effectively assigning caregivers to patients.

BRIEF DESCRIPTION

In one aspect, a caregiver assignment (CA) computing system for assigning at least one caregiver to at least one patient is described. The CA computing system includes at least one processor coupled to a database. The at least one processor is configured to receive caregiver data, the caregiver data in a first format and including a current workload for at least one candidate caregiver of a plurality of candidate caregivers and convert the caregiver data in the first format into a shared format, the converted caregiver data including an indication of the current workload for the at least one caregiver. The at least one processor is also configured to receive patient data associated with a patient, the patient data in a second format and including a location where care will be administered to the patient and a type of care to be administered to the patient, determine care data from the patient data, the care data including an estimated amount of time required to administer care to the patient associated with the patient data, and convert the care data into the shared format, the converted care data indicating the estimated amount of time required to administer care to the patient. The at least one processor is further configured to automatically generate, in real time and based at least upon the converted caregiver data and the converted care data, an assignment of a caregiver of the plurality of caregivers to the patient.

In another aspect, a method for assigning at least one caregiver to at least one patient is described. The method includes receiving caregiver data, the caregiver data in a first format and including a current workload for at least one candidate caregiver of a plurality of candidate caregivers and converting the caregiver data in the first format into a shared format, the converted caregiver data including an indication of the current workload for the at least one caregiver. The method also includes receiving patient data associated with a patient, the patient data in a second format and including a location where care will be administered to the patient and a type of care to be administered to the patient, determining care data from the patient data, the care data including an estimated amount of time required to administer care to the patient associated with the patient data, and converting the care data into the shared format, the converted care data indicating the estimated amount of time required to administer care to the patient. The method further includes automatically generating, in real time and based at least upon the converted caregiver data and the converted care data, an assignment of a caregiver of the plurality of caregivers to the patient.

In yet another aspect, at least one non-transitory computer-readable storage media having computer-executable instructions embodied thereon is described. When the computer-executable instructions are executed by a caregiver allocation (CA) computing device, including at least one processor in communication with a database, the computer-executable instructions cause the CA computing device to receive caregiver data, the caregiver data in a first format and including a current workload for at least one candidate caregiver of a plurality of candidate caregivers and convert the caregiver data in the first format into a shared format, the converted caregiver data including an indication of the current workload for the at least one caregiver. The instructions also cause the CA computing device to receive patient data associated with a patient, the patient data in a second format and including a location where care will be administered to the patient and a type of care to be administered to the patient, determine care data from the patient data, the care data including an estimated amount of time required to administer care to the patient associated with the patient data, and convert the care data into the shared format, the converted care data indicating the estimated amount of time required to administer care to the patient. The instructions further cause the processor to automatically generate, in real time and based at least upon the converted caregiver data and the converted care data, an assignment of a caregiver of the plurality of caregivers to the patient.

BRIEF DESCRIPTION OF THE DRAWINGS

FIG. 1 is a schematic diagram illustrating an example caregiver assignment (CA) computing system for assigning caregivers to patients in accordance with the present disclosure.

FIG. 2 is an example data flow diagram for assigning a caregiver to a patient in accordance with the present disclosure.

FIG. 3 is an example data flow diagram of reassigning at least one caregiver to at least one patient in accordance with the present disclosure.

FIG. 4 is an example configuration of a computing device, in accordance with the present disclosure.

FIG. 5 is an example configuration of server components for assigning caregivers to patients in accordance with the present disclosure.

FIG. 6 is an example flow chart of an example process for assigning at least one caregiver to at least one patient in accordance with the present disclosure.

FIG. 7 is a diagram of components of one or more example computing devices that may be used in the CA computing system shown in FIG. 1.

FIG. 8 is a diagram of an example problem tree that may be solved by the CA computing system shown in FIG. 1.

DETAILED DESCRIPTION

Figure 1:
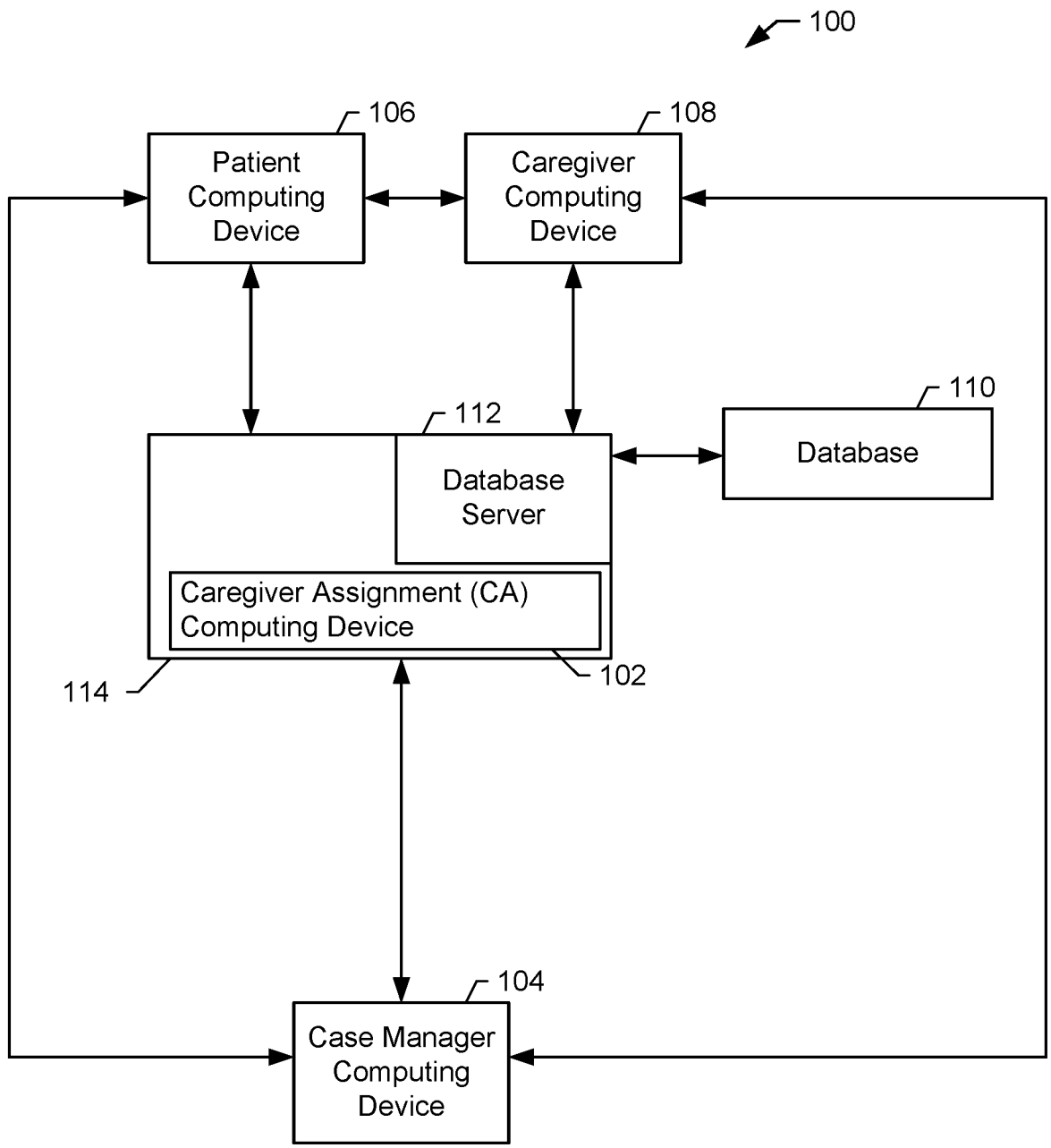
FIGS. 1-8 show example embodiments of the systems and methods described herein.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

A caregiver assignment (CA) computing system configured to assign caregivers (e.g., a care manager or nurse) to patients (e.g., members of a caregiving plan) is described herein. In one example embodiment, the CA computing system may assign a new patient to a caregiver. In another example embodiment, the CA computing system may be configured to reassign existing patients to caregivers to better optimize, as an example, caregiver travel time. In other examples, the CA computing system is further configured to reassign existing patients to caregivers based on a variety of factors, such as medical expertise and/or language spoken.

In the example embodiment, the CA computing system includes at least one CA computing device in communication with at least one case manager computing device, at least one patient computing device, and at least one caregiver computing device. The CA computing device is further in communication with at least one database that may store and/or process data, such as patient data, including information regarding at least one patient, and caregiver data, including information regarding at least one caregiver.

In the example embodiment, patient data associated with a patient may include, among other data, a patient name, a patient address, a patient phone number, a patient email address, patient medical information, patient preferences (e.g., a primary language), and/or other data associated with a patient. The patient data is stored in a database, and is used by the CA computing device to determine a caregiver to assign to at least one patient associated with the patient data.

In the example embodiment, caregiver data associated with a caregiver may include, among other data, a caregiver name, a caregiver phone number, at least one address where a caregiver provides care to at least one patient (e.g., a patient home address), an indication of the current workload of a caregiver, an indication of the workload capacity of a caregiver (e.g., a maximum workload and/or a minimum workload), caregiver preferences, and/or other data associated with a caregiver. The caregiver data is stored in a database (e.g., a memory device), and is used by the CA computing device to determine a caregiver to assign to at least one patient.

In the example embodiment, the CA computing device is configured to assign at least one caregiver to at least one patient based at least in part on patient data and caregiver data stored in a database. The CA computing device may be configured to assign a caregiver to a patient based on at least one of, for example, travel time required for a caregiver to travel to a patient address (e.g., and/or mileage required to travel to a patient address (e.g., for reimbursement purposes)), the type of care to be administered to a patient, in some embodiments indicated by care data including a patient score that indicates an estimated amount of time required to administer care to a patient, certifications required to administer care to a patient (e.g., medical certifications), patient preferences (e.g., caregiver languages spoken), caregiver preferences, caregiver workload capacity, current caregiver workload, and/or case manager preferences. In some embodiments, the CA computing device may be configured to assign a caregiver to a patient based on a combination of any of the factors listed herein.

In some embodiments, the CA computing device may be configured to reassign at least one caregiver to at least one patient in order to more efficiently manage, for example, caregiver travel time. In further embodiments, the CA computing device is configured to determine, based on patient data and caregiver data, where and when it may be optimal to hire one or more new caregivers. In yet further embodiments, the CA computing device may be configured to determine patient scores based on patient data. The patient scores represent an amount of time that will likely be required for a caregiver to provide care to the patient (e.g., actual amount of time to treat patient, along with the amount of time to prepare and submit any required paperwork associated with treating the patient, etc.). For example, patient scores may be integers and/or decimals on a predetermined scale of one to ten. In these embodiments, the patient data for a particular patient may be modified over time to indicate the amount of time being spent administering care to the patient. For example, an initial patient score may indicate less time required to administer care to a patient than the amount of time a caregiver is actually spending administering care to a patient. Accordingly, in these embodiments, the CA computing device is configured to modify the patient score to indicate the actual amount of time being spent administering care to the patient. In some embodiments, the CA computing device is configured to use the modified patient scores when determining patient scores for new patients. For example, if one patient's score is modified from a three to a five, and a new patient has characteristics and/or conditions similar to those of the patient with the modified patient score, the new patient may be assigned a patient score of five rather than three. In some embodiments patient scores may be included in care data. In these embodiments, care data may be included in patient data stored in the database. The use of quantified patient scores, rather than imprecise estimates in minutes or hours, simplifies the consideration of multiple variables in the caregiver assignment process.

In some embodiments, certain patient scores may be compared amongst caregivers in order, for example, for the system to determine which caregivers are more efficient. In other words, if two caregivers are assigned patients with similar characteristics and the patients assigned to one caregiver are assigned patient scores significantly lower (e.g., indicating less time is needed to treat the patient) than patient scores for the other caregiver, the lower patient scores for the first caregiver may be an indication that the first caregiver is more efficient than the second caregiver.

Further, the CA computing device may be configured to implement certain requirements when making recommendations in assigning caregivers to patients. For example, while the CA computing device may initially determine optimal assignments of caregivers to patients, certain requirements may need to be considered that would require modification to the optimal assignments. As examples, certain jurisdictions may require that a caregiver speak the same language as the patient and/or that certain caregivers have certain certifications/qualifications in order to administer care to certain patients. Accordingly, in such jurisdictions and/or other jurisdictions, the CA computing device may be configured to account for a variety of requirements that need to be met when assigning caregivers to patients.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, statistics and information, and/or historical data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As described above, the systems and methods described herein may use machine learning, for example, for pattern recognition. That is, machine learning algorithms may be used by the CA computing system to attempt to identify patterns regarding optimizing assigning caregivers to patients. Accordingly, the systems and methods described herein may use machine learning algorithms for both pattern recognition and predictive modeling (e.g., based upon data regarding modified patient scores over time). As an example, the CA computing system may utilize machine learning techniques in determining weights for a plurality of factors (e.g., health factors, spoken language, certifications required, etc.) when determining a patient score, as described herein.

Further, the CA computing system may train a model according to a plurality of data sets (e.g., travel time required for a caregiver to meet a patient and time required for the caregiver to administer care to the patient). For example, the CA computing system may train a model over time to adjust certain patient scores (e.g., because of greater or less determined travel time and/or time required to administer care to a patient), and generate at least one new optimal caregiver assignment based upon the trained model. Data utilized by the CA computing system to train a model may include more or less data than described herein (e.g., for example any number of data sets may be utilized to train the model). In addition to modifying caregiver assignments to patients over time, the CA computing system may utilize the trained model in assigning caregivers to new patients (e.g., by utilizing the trained model, instead of data initially inputted to the system, the CA computing system may more efficiently assign caregivers to patients). In other words, the CA computing system may train the model over time such that the model accounts for certain routes and/or times of travel being more or less than previously predicted by the system/model, and/or certain types of care requiring more or less treatment time than previously predicted by the system/model.

In some embodiments, the CA computing device may provide outputs in real time in order to further optimize assigning caregivers to patients. For example, the CA computing device may output to a caregiver computing device, a schedule for the day wherein the schedule includes at least the patients the caregiver is assigned to on that particular day (and/or any other time period) and the times at which the caregiver should be treating the patients. The CA computing device may further provide navigational tools to the caregiver computing device such that the caregiver can more efficiently travel from patient to patient (e.g., the CA computing device may monitor certain traffic events (e.g., as received from a third party system) in order to route caregivers around traffic events that may delay the caregiver arriving to a particular location).

In some embodiments, the CA computing device may provide outputs to a patient computing device in order to notify a patient of the travel status of a caregiver (e.g., an estimated arrival time). For example, the CA computing device may notify a patient (e.g., by transmission of data to a patient computing device) of a time a caregiver is scheduled to provide care to the patient and/or a location at which the care is to be provided. The CA computing device may also notify the patient of a time when the caregiver is en route to the appointment, when the caregiver has almost arrived to the appointment (e.g., when the caregiver is 5 minutes away), and/or when the caregiver has arrived at the appointment location. In some embodiments the CA computing device may provide a real time map to a patient computing device such that the patient can view, at the patient computing device, an approximate location of their assigned caregiver (e.g., location at a particular intersection, on a particular road, etc.).

In some embodiments, the CA computing device may monitor caregivers (e.g., via a caregiver computing device) and may determine that a particular caregiver is running behind schedule. For example, the CA computing device may track the location of a caregiver computing device and determine that a caregiver arrived at a most-recent appointment an hour late. In order to optimize assigning caregivers to patients, the CA computing device may recommend (e.g., to a case manager computing device and/or a patient computing device) a modification to the caregiver schedule and/or automatically modify the caregiver schedule. In other words, the CA computing device may reassign caregivers to one or more appointments the caregiver who is running late is assigned to for that particular day. In some embodiments, the CA computing device may require authorization from a case manager computing device and/or a patient computing device in order to modify one or more caregiver schedules. As another example, if a particular caregiver is consistently late to a particular appointment, the CA computing device may utilize artificial intelligence techniques (e.g., as described above) in order to train a model according to whether the caregiver is arriving late because of travel time and/or time required to administer care to patients earlier in their schedule. In some embodiments, the CA computing device may be configured to analyze and respond to data and/or other factors as described herein to generate and transmit responses/alerts in real time and/or near real time (e.g., to a case manager computing device, caregiver computing device, patient computing device, etc.) such that a recipient may act on the received time-sensitive data in a more efficient manner than is otherwise possible (e.g., by receiving a plurality of different types of data from CA computing device, a recipient may respond in real time instead of having to gather data from a plurality of sources).

At least some of the technical problems addressed by this system include: (a) a manual, labor-intensive process conventionally required to assign caregivers to patients; (b) caregivers being assigned to patients based on regions, due to the human mind being limited in optimizing caregiver travel time within a region; (c) caregivers being assigned to patients based only on region, without taking into account other important factors such as spoken language and/or certification requirements; (d) caregiver workload being too high due to the human mind being unable to account for multiple variables in an optimization process; and (e) caregiver and/or patient preferences not being adequately considered when assigning caregivers to patients.

A technical effect of the systems and methods described herein is achieved by performing at least one of: (a) receiving, at a processor, patient data associated with a patient, the patient data including a location where care will be administered to the patient and a type of care to be administered to the patient; (b) determining, by a processor, based on the patient data, at least one candidate caregiver eligible for assignment to the patient; (c) receiving, at a processor, caregiver data, including a current workload for the at least one caregiver; (d) determining, by a processor, care data from the patient data, the care data including an estimated amount of time required to administer care to the patient associated with the patient data; and (e) assigning, by a processor, from the at least one candidate caregiver based on the patient data, the caregiver data, and the care data, a caregiver to the patient.

The technical effects and advantages achieved by this system are at least one of: (a) removing the manual, labor-intensive process of assigning caregivers to patients; (b) optimizing travel time when assigning caregivers to patients; (c) accounting for multiple factors when assigning caregivers to patients such as spoken language and/or certification requirements; (d) accounting for caregiver workload when assigning caregivers to patients; (e) accounting for caregiver and patient preferences when assigning caregivers to patients; and (f) quantizing an amount of time needed to care for a patient to simplify the assignment process.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, CA). In yet a further embodiment, the system is run on a Mac OS® environment (Mac OS is a registered trademark of Apple Inc. located in Cupertino, CA). In a further embodiment, the system is run on a Linux® environment (Linux is a registered trademark of Linus Torvalds in the United States and other countries). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Washington). The application is flexible and designed to run in various different environments without compromising any major functionality.

As used herein, an element or step recited in the singular and preceded with the word "a" or "an" should be understood as not excluding plural elements or steps, unless such exclusion is explicitly recited. For example, reference to "an allocation plan" may refer to a plurality of allocation plans. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example caregiver assignment (CA) computing system 100 for assigning caregivers to patients in accordance with the present disclosure. CA computing system 100 includes at least one CA computing device 102, implemented on a server 114, and in communication with at least one case manager computing device 104, at least one patient computing device 106, and/or at least one caregiver computing device 108. Although FIG. 1 only shows one of each computing device 102-108, it should be recognized that any number of computing devices 102-108 may be used in CA computing system 100. CA computing device 102 is further in communication with at least one database 110 that may store and/or process data, such as patient data, caregiver data, and/or any other data described herein. For example, a first database may store patient data, a second database may store caregiver data, and a third database may store other data described herein. A database server 112 may be in communication with database 110, which contains information on a variety of matters, as described below in greater detail. In one embodiment, database 110 is stored on server 114 and may be accessed by logging onto server 114 and/or CA computing device 102 via, for example, case manager computing device 104. In another embodiment, database 110 is stored remotely from server 114 and may be non-centralized.

In the example embodiment, case manager computing device 104 (e.g., a smartphone, laptop, tablet, etc.) is configured to receive inputs from a user thereof (e.g., a case manager) and transmit data to CA computing device 102. For example, a case manager input may be a request for CA computing device 102 to assign a caregiver to a patient. Case manager computing device 104 may also be in communication with patient computing device 106 and caregiver computing device 108.

In the example embodiment, patient computing device 106 (e.g., a smartphone, laptop, tablet, etc.) is configured to receive inputs from a user thereof (e.g., a patient) and transmit data to CA computing device 102. For example, a patient input may be patient data including patient preferences regarding which caregiver should be assigned to the patient. Patient computing device 106 may also be in communication with case manager computing device 104 and/or caregiver computing device 108.

Further in the example embodiment, caregiver computing device 108 (e.g., a smartphone, laptop, tablet, etc.) is configured to receive inputs from a user thereof (e.g., a caregiver) and transmit data to CA computing device 102. For example, a caregiver input may be caregiver data including caregiver preferences regarding which patients may be assigned to the caregiver. Caregiver computing device 108 may also be in communication with case manager computing device 104 and/or patient computing device 106. For example, caregiver computing device 108 may be in communication with patient computing device 106 such that a caregiver can administer care virtually to a patient (e.g., via video and/or audio communication) (e.g., CA computing device 102 may facilitate establishing a secure connection between device 106 and 108).

Figure 2:
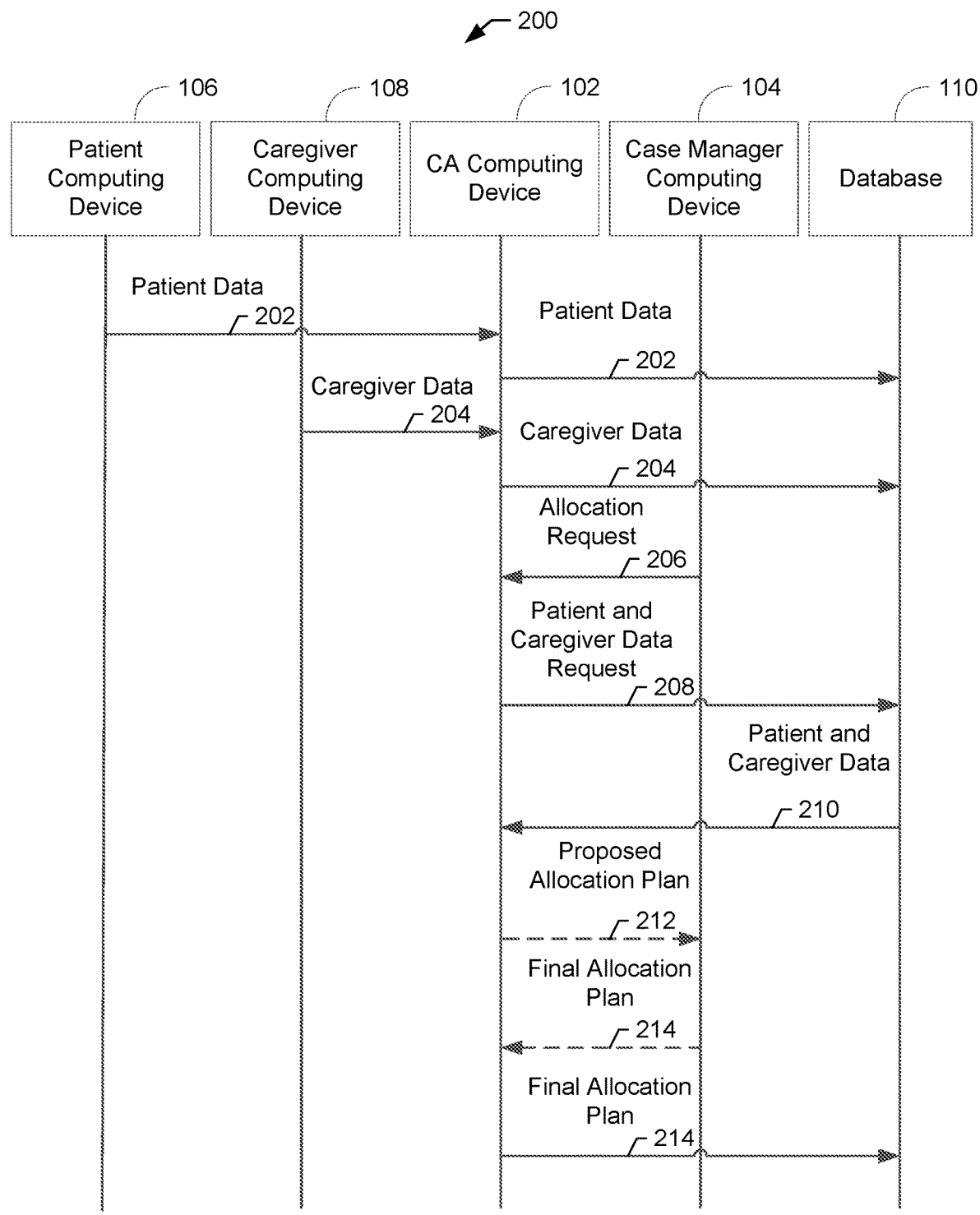

FIG. 2 is an example data flow diagram 200 for assigning a caregiver to a patient, as implemented using CA computing system 100 shown in FIG. 1. In the example embodiment, a patient may log in or register with CA computing system 100 by inputting registration data (not shown) that may include, for example, a username, password, biometric data, and/or other information at patient computing device 106. After CA computing device 102 confirms the registration data, a patient may then input patient data 202 to CA computing device 102 via patient computing device 106. In the example embodiment, patient data 202 includes, among other data, a patient name, a patient home address, a patient phone number, a patient email address, patient medical information, a patient-preferred language, other patient preferences, and/or other data associated with a patient.

Patient data 202 may also include an indication of certification requirements that a caregiver assigned to the patient associated with patient data 202 must include. In other embodiments, caregiver computing device 108 may be configured to determine certification requirements a caregiver must have in order to be assigned to a patient based on patient data 202. In the some embodiments, CA computing device 102 may add data to patient data 202 such as, for example, care data including a patient score corresponding to an estimated amount of time that will be required to administer care to a patient. In some embodiments, patient scores may be quantified, e.g. on a predetermined scale from one to ten, with one indicating a low estimated amount of care and ten indicating a high estimated amount of care. For example, a patient with a condition requiring a relatively high amount of care may be assigned a patient score of eight while a patient with a condition requiring a relatively low amount of care may be assigned a patient score of two. Upon receipt of patient data 202, CA computing device 102 transmits patient data 202 to database 110 for storage.

In some embodiments, CA computing device 102 may be configured to modify patient scores over time such that patient scores better indicate an amount of time being spent administering care to a patient. For example, a patient's score may be modified from two to four if it is taking more time for a caregiver to administer care to a patient than was initially expected. In some embodiments, as CA computing device 102 modifies patient scores over time, CA computing device 102 may utilize artificial intelligence techniques to, as an example, utilize how patient scores have changed over time when assigning scores to new patients and/or modifying scores for certain patients. For example, CA computing device 102 (e.g., implementing and/or training a model) may determine that certain patient conditions require more care than previously determined by the system, and may update patient scores associated with patients with those certain conditions accordingly (e.g., by raising the patient scores).

In the example embodiment, a caregiver may log in or register with CA computing system 100 by inputting registration data (not shown) that may include, for example, a username, password, biometric data, and/or other information via caregiver computing device 108. After CA computing device 102 confirms the registration data, a caregiver may then input caregiver data 204 to CA computing device 102 via caregiver computing device 108. In the example embodiment, caregiver data 204 includes, among other data, a caregiver name, addresses where the caregiver associated with caregiver data 204 already administers care, a caregiver phone number, a caregiver email address, languages a caregiver speaks, caregiver certifications (e.g., medical certifications), caregiver workload capacity, indicating a workload the associated caregiver can accept, a current caregiver workload, indicating the associated caregiver's current workload, and/or other data associated with a caregiver. CA computing device 102 is configured to receive caregiver data 204 and transmit caregiver data 204 to database 110.

In some embodiments, caregiver data 204 may include a caregiver workload (e.g., a number of hours the caregiver will work) and may be translated by CA computing device 102 into a caregiver score (e.g., a particular caregiver may be able to handle a workload corresponding to 200 points of patient scores, while another caregiver may be able to handle a workload corresponding to 300 points of patient scores). In the example embodiment, caregiver scores and patient scores may be converted/translated into the same format (e.g., a numerical score/number of points as determined by CA computing device 102) by CA computing device 102 in order to better implement assigning caregivers to patients. For example, in some embodiments CA computing device 102 may receive data regarding at least one patient and at least one caregiver (e.g., as described herein), and translate that data into simplified formats (e.g., including scores) such that CA computing device 102 may more easily determine which patients may be assigned to which caregivers.

In some embodiments, a case manager can access and edit patient data 202 and/or caregiver data 204 from case manager computing device 104 via CA computing device 102. In other embodiments, another qualified user of CA computing system 100 may edit patient data 202, caregiver data 204, and/or any other data stored in database 110. For example, if a caregiver is assigned a new patient, the assigned caregiver may not need to be the person logging on to and entering data associated with their workload each time they are assigned a new patient. As another example, a case manager may wish to enter notes regarding a certain patient that will be stored with and/or modify patient data 202. In yet another example, a case manager may edit patient data 202 to indicate a caregiver assigned to the patient may need to have certain requirements (e.g., caregiver needs to be a registered nurse (RN)).

In the example embodiment, when a new patient submits patient data 202, for example, a case manager may enter an allocation request 206 to request CA computing device assign a caregiver to the new patient. Allocation request 206 is entered by a case manager at case manager computing device 104 and is transmitted from case manager computing device 104 to CA computing device 102. CA computing device 102 is configured to then transmit patient and caregiver data request 208 to database 110, including a request for patient data associated with the new patient and caregiver data associated with potential caregivers that could be assigned to the patient. Caregivers that could be assigned to the patient may include, for example, caregivers located in the same region as the patient and/or caregivers with the expertise required to administer care to the patient. CA computing device 102 is configured to then receive patient and caregiver data 210 from database 110, including the requested patient data and the requested caregiver data.

Upon receipt of patient and caregiver data 210, CA computing device is configured, in some embodiments, to determine an allocation plan indicating a caregiver to be assigned to the patient and the corresponding caregiver's workload if the caregiver is assigned to the patient. For example, the patient to be assigned may have a patient score of four, included in patient data 202 stored in database 110. In this example, CA computing device 102 applies an initial filter to determine at least one candidate caregiver that is eligible for assignment to the patient. For example, CA computing device 102 may determine which caregivers have the appropriate certifications to administer care to the patient, and/or which caregivers have an available workload to administer care to the patient (e.g., the total number of patient scores for patients they are handling is less than their caregiver score corresponding to a workload they can handle). For example, the current workload of the caregiver may be expressed as a simple sum of the patient scores of all patients already assigned to the caregiver, and then caregiver capacity may be a maximum sum of patient scores that can be assigned to the caregiver. If adding the patient score of the new patient would not cause the workload to exceed the capacity, the caregiver is eligible for assignment to the new patient.

In some embodiments, caregiver workloads may exceed the caregiver capacity/score because of an insufficient number of caregivers. Accordingly, CA computing device 102 may be configured to monitor and analyze caregiver capacities/scores and recommend when and where it may be optimal/required to hire one or more new caregivers. For example, if a threshold number of caregivers in a certain region have workload (scores) above their caregiver capacities/scores, CA computing device 102 may recommend (e.g., by transmitting an alert to case manager computing device 104) that at least one new caregiver (or any number of caregivers required to adjust the current caregiver workloads/scores to below their capacities) be hired in that region. Further, CA computing device 102 may be configured to generate a recommended profile of certain qualifications the one or more new caregivers to be hired should have in order to fit the needs of patients who will potentially be reassigned (e.g., certain certifications and/or language requirements).

In some embodiments, if more than one caregiver meets the qualifications described above, CA computing device 102 may determine which of those candidate caregivers would need the least amount of travel time to travel to the location where care will be administered to the patient, and assign that caregiver to the patient. Upon assigning a caregiver to a patient, CA computing device is configured to transmit final allocation plan 214, indicating the caregiver assigned to the patient, to database 110. In some embodiments, final allocation plan 214 may include a plurality of reassignments, despite there being only one new patient. For example, if a new patient has a patient score of four, but a desired or qualified caregiver, because of an existing workload, can only take on a patient with a score of two, the system may automatically reassign one of the caregiver's current patients so that the caregiver can now be assigned the new patient and not exceed a workload capacity. Such reassignments may be triggered automatically where no qualified caregivers currently have available capacity in a region, for example. The system may compute reassignment for several potential caregivers, and choose the allocation plan that requires the fewest reassignments. The patient, caregiver, and case manager described above may then be able to access the final allocation plan 214 in database 110 via CA computing device 102 and their respective computing devices 104-108.

In some embodiments, before transmitting final allocation plan 214 to database 110, CA computing device 102 may be configured to determine and transmit a proposed allocation plan 212, indicating a proposed caregiver to be assigned to the patient, to case manager computing device 104. In some embodiments, CA computing device 102 may be configured to determine and transmit a plurality of proposed allocation plans (e.g., proposed allocation plan 212) such that a case manager may select at least one of the proposed allocation plans. A case manager can then review and modify at least one proposed allocation plan 212. For example, a case manager may be aware of other factors not known to CA computing device 102, and may want to assign a different caregiver to the patient than what was proposed by CA computing device 102. Accordingly, a case manager can modify proposed allocation plan 212 to generate, at case manager computing device 104, a final allocation plan 214. Final allocation plan 214 is then transmitted from case manager computing device 104 to CA computing device 102, and then is transmitted from CA computing device to database 110 for storage. Upon case manager modification of a proposed allocation plan, CA computing device 102 may utilize artificial intelligence techniques in order to implement and consider such modifications when developing allocation plans. For example, certain case managers may have certain preferences that CA computing device 102 recognizes and implements over time when generating proposed allocation plans.

Once final allocation plan 214 is stored in database 110, final allocation plan 214 can be accessed by a case manager via case manager computing device 104 and CA computing device 102. In some embodiments, patients and/or caregivers can access portions of final allocation plan 214. For example, upon entering a username and password, a patient and/or caregiver may be granted access to viewing portions of final allocation plan 214. For example, a patient may have access to see which caregiver is assigned to them, and a caregiver may have access to see which patients are assigned to them.

In some embodiments, CA computing device 102 may be configured to generate, along with final allocation plan 214, one or more waitlists corresponding to final allocation plan 214 (e.g., and/or proposed allocation plan 212). For example, in some embodiments CA computing device 102 may determine that it is optimal for an initial caregiver to take on any number of new patients (e.g., in terms of time efficiency), but that this particular caregiver taking on new patients would cause the caregiver to exceed their workload. Thus, CA computing device 102 may assign the new patients to one or more other caregivers in order to keep the initial caregiver workload below capacity, despite determining that assigning the new patients to the initial caregiver would be more time/cost efficient. Accordingly, a waitlist corresponding to any number of patients (e.g., and their patient scores) may be stored such that when/if the initial caregiver workload is lessened (e.g., by another patient being removed from the system), CA computing device 102 can check the stored waitlist and re-assign one or more patients from the waitlist to being assigned to the caregiver (e.g., and removing them from their current caregiver's list of assignments). As described herein, after moving a patient from a waitlist to the caregiver assignments (e.g., "promoting" the patient), CA computing device 102 may further analyze any number of other current relationships to generate a new allocation plan based upon the patient being promoted from the waitlist to the list of patients currently assigned to the caregiver. In other words, now that the patient has been assigned to the initial (more optimal) caregiver, they are no longer assigned to their previous caregiver. Thus, the previous caregiver may now have more available capacity, and CA computing device 102 may promote a patient from the previous caregiver's waitlist to fill that capacity (e.g., and so forth with other caregiver/patient assignments and patients are initially assigned and/or re-assigned).

Figure 3:
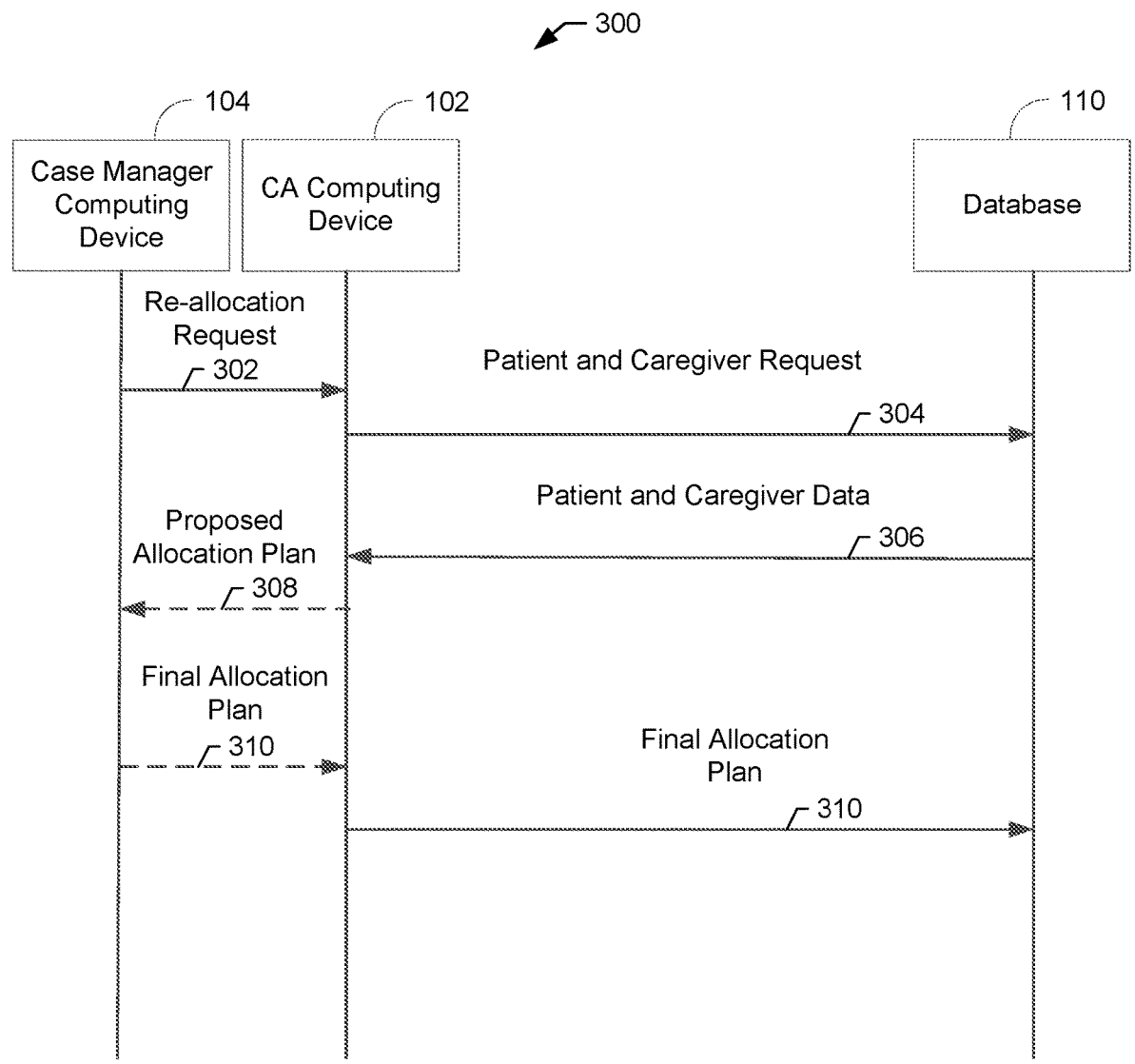

FIG. 3 is an example data flow diagram 300 for reassigning at least one caregiver to at least one patient as implemented using CA computing system 100 shown in FIG. 1. In the example embodiment, a case manager may request re-allocation of caregiver assignments to patients at case manager computing device 104. In some embodiments, re-allocation request 302 may include a request for mass re-assignment to reach an optimized solution wherein all patients may be re-assigned. In some embodiments, re-allocation request 302 may include a request to only assign new patients and not re-assign existing patients. Upon requesting a re-allocation request as described above, case manager computing device 104 transmits re-allocation request 302 to CA computing device 102. In some embodiments a different user of CA computing system 100 may request a re-allocation of caregiver assignments. In yet further embodiments CA computing device 102 may determine an appropriate time to re-allocate caregiver assignments. For example, CA computing device 102 may determine to re-allocate caregiver assignments based on travel time for a predetermined number of caregivers being greater than a predetermined threshold amount of time. In these embodiments, CA computing device 102 may be configured to transmit a signal to, for example, case manager computing device 104 indicating a request to re-allocate caregiver assignments before re-allocating caregiver assignments.

In some embodiments, CA computing device 102 may be configured to, instead of requesting to re-allocate caregiver assignments, generate and transmit a signal to, for example, case manager computing device 104 indicating that it would be beneficial to hire a new caregiver. For example, if a certain number of caregivers are working at a workload higher than a pre-determined threshold, CA computing device 102 may transmit a signal to case manager computing device 104 indicating the caregiver workload and indicating hiring a new caregiver would bring the caregiver workload for at least one caregiver back to or below the pre-determined threshold. In some embodiments, re-allocation request 302 may include at least one manual assignment of a caregiver to a patient and/or a request that at least one patient not be re-assigned. For example, if a patient has had the same caregiver for a number of years, the patient may not want to be assigned to a new caregiver. In some embodiments, a user (e.g., a case manager) can indicate in re-allocation request 302 that CA computing device 102 should not reassign, for example, the particular patient who has had the same caregiver for a number of years as described above.

In the example embodiment, upon receipt of re-allocation request 302, CA computing device 102 is configured to transmit patient and caregiver request 304 to database 110, including a request for patient and caregiver data. In some embodiments, patient and caregiver request 304 may include a request for all patient and caregiver data in database 110. In other embodiments, patient and caregiver request 304 may include a request for patient and caregiver data only associated with patients and caregivers in a certain region, for example. Upon receipt of patient and caregiver request 304, database 110 is configured to transmit patient and caregiver data 306, associated with at least one patient and/or at least one caregiver associated with patient and caregiver request 304, to CA computing device 102. In some embodiments, patient and caregiver data 306 may include rankings of caregivers by patients and/or rankings of patients by caregivers, indicating preferences of caregivers and/or patients as to which caregiver should be assigned to which patient. These rankings may be generated at patient computing device 106 and/or caregiver computing device 108, and transmitted to database 110 via CA computing device 102.

In the example embodiment, upon receipt of patient and caregiver data 306, CA computing device 102 is configured to generate an allocation plan including re-assignment of at least one caregiver to at least one patient. In generating the allocation plan, CA computing device 102 may take in to account a variety of factors. In some embodiments, CA computing device 102 may generate an allocation plan such that caregiver travel time is optimized (e.g., low mean distance traveled for caregivers), each patient is matched with a caregiver who has appropriate qualifications to administer care to the patient (e.g., medical certifications and spoken-language requirements), and/or each caregiver does not have a workload above a pre-determined threshold. In some embodiments, CA computing device 102 may generate an allocation plan such that costs are minimized based on at least the factors described above (e.g., cost of reimbursing caregiver fuel and mileage, translation cost, caregiver pay rate, etc.).

In some embodiments, different factors may have different "weights" in determining an allocation plan. For example, CA computing device 102 may be configured to weigh caregiver and/or patient preferences more than caregiver travel time when generating an allocation plan (e.g., a patient may prefer a caregiver of a certain sex). As another example, if virtual care is being provided by a caregiver to a patient, travel time may have no weight in the determination because care is being provided virtually and no travel is required. Upon generating an allocation plan, CA computing device 102 is configured to transmit a final allocation plan 310 to database 110. In some embodiments, an allocation plan generated by CA computing device 102 may be transmitted from CA computing device 102 to case manager computing device 104 as a proposed allocation plan 308. In these embodiments a case manager can review and/or modify proposed allocation plan 308 to generate final allocation plan 310.

In some embodiments, CA computing device 102 may be configured to determine an allocation plan to optimize at least one of: mean distance between caregivers and their assigned patients; total distance between caregivers and their assigned patients; accuracy of patient assignments to caregivers with appropriate credentials; stability; Pareto optimality (e.g., where it is impossible to reallocate to make one caregiver/patient better off without making at least one other caregiver/patient worse; popularity (e.g., if there is no other matching that is preferred by the majority of patients; and/or profile-based optimality (e.g., each caregiver may have a ranked list of preferred members. Optimizing the profile/assignments maximizes number of providers with their $1^{st}$ choice, then $2^{nd}$, etc.).

Figure 4:
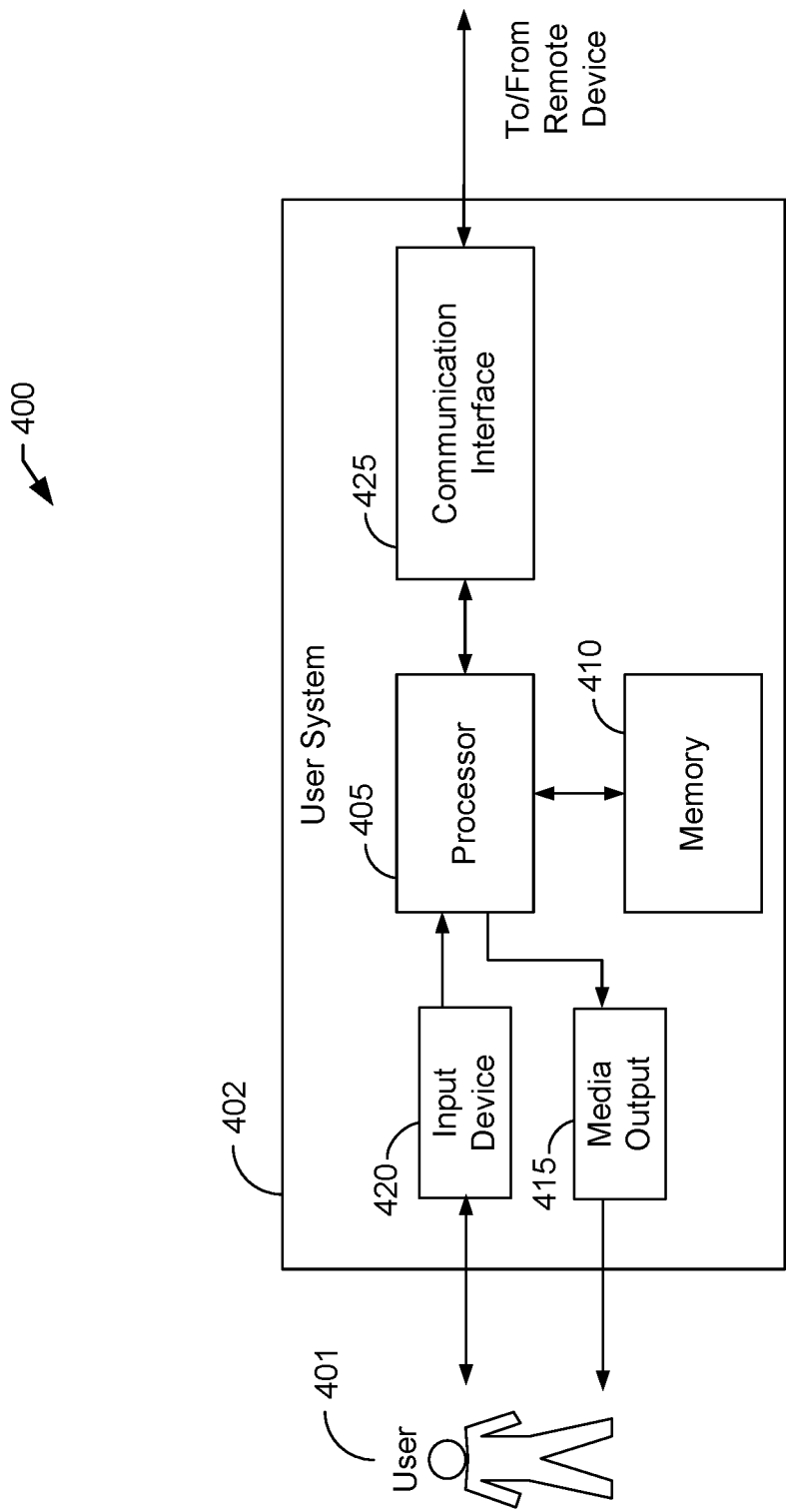

FIG. 4 illustrates an example configuration of a user system 402 operated by a user 401. In the example embodiment, user system 402 may be used to implement case manager computing device 104, patient computing device 106, and/or caregiver computing device 108 (shown in FIG. 1), and may be used by user 401 to interact with CA computing device 102 (also shown in FIG. 1). More specifically, user system 402 may be used to, for example, generate and transmit patient data 202, caregiver data 204, and/or allocation request 206 (shown in FIG. 2). In the example embodiment, user system 402 includes a processor 405 for executing instructions. In some embodiments, executable instructions are stored in a memory area 410. Processor 405 may include one or more processing units, for example, a multi-core configuration. Memory area 410 is any device allowing information such as executable instructions and/or written works to be stored and retrieved. Memory area 410 may include one or more computer readable media.

User system 402 also includes at least one media output component 415 for presenting information to user 401. Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device, a liquid crystal display (LCD), organic light emitting diode (OLED) display, or "electronic ink" display, or an audio output device, a speaker or headphones.

In some embodiments, user system 402 includes an input device 420 for receiving input from user 401. Input device 420 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 415 and input device 420. User system 402 may also include a communication interface 425, which is communicatively couplable to a remote device, such as CA computing device 102. Communication interface 425 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 410 are, for example, computer readable instructions for providing a user interface to user 401 via media output component 415 and, optionally, receiving and processing input from input device 420. A user interface may include, among other possibilities, a web browser and client application. Web browsers enable users, such as user 401, to display and interact with media and other information typically embedded on a web page or a website from CA computing device 102. A client application allows user 401 to interact with a server application from CA computing device 102.

Figure 5:
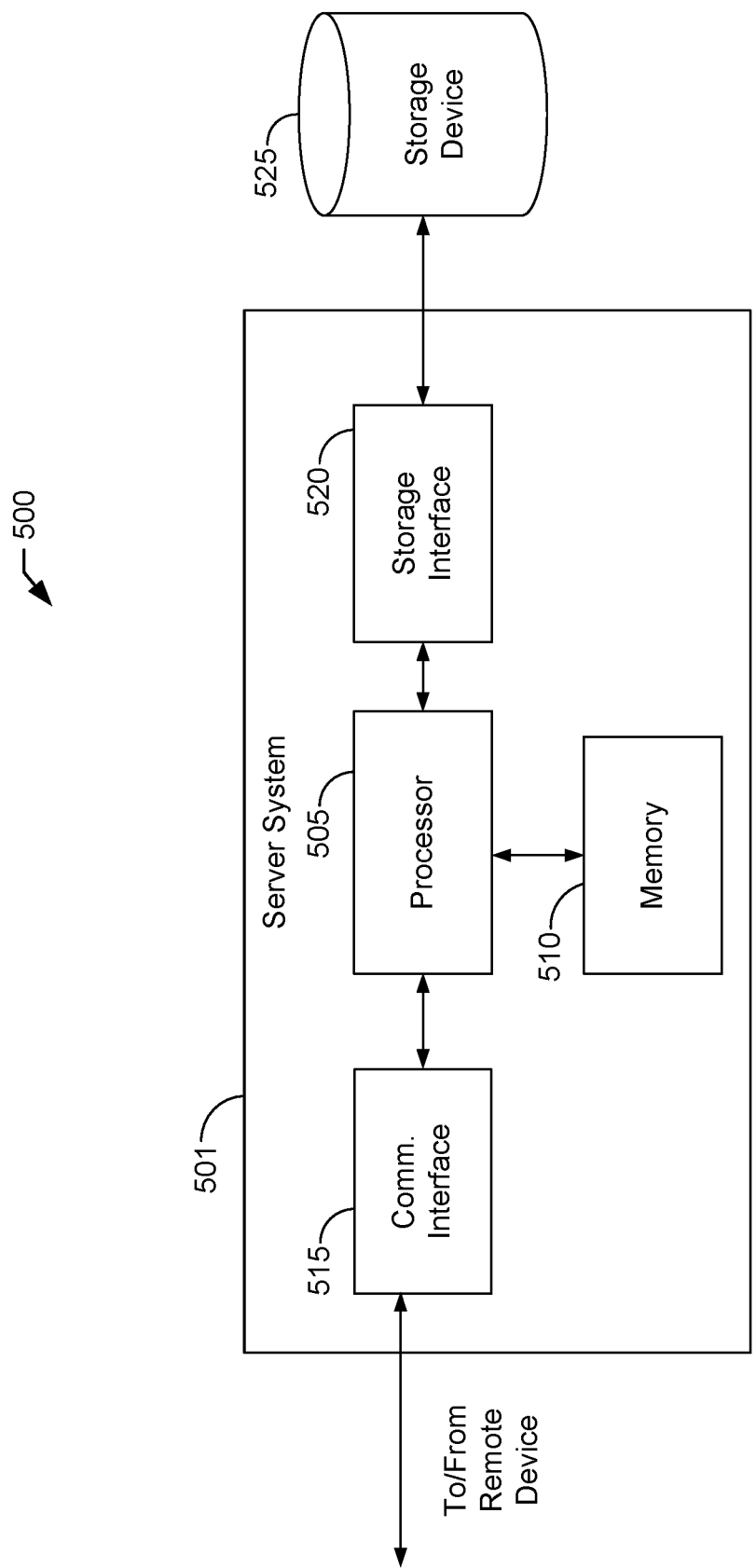

FIG. 5 illustrates an example configuration of a server system 501. Server system 501 may be used to implement CA computing device 102 (shown in FIG. 1), for example. Server system 501 includes a processor 505 for executing instructions. Instructions may be stored in a memory area 510, for example. Processor 505 may include one or more processing units (e.g., in a multi-core configuration) for executing instructions. The instructions may be executed within a variety of different operating systems on server system 501, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 505 is operatively coupled to a communication interface 515 such that server system 501 is capable of communicating with a remote device such as user system 402 (shown in FIG. 4) or another server system 501. For example, communication interface 515 may receive requests from, and send results to, case manager computing device 104, patient computing device 106, and/or caregiver computing device 108 via the Internet, as illustrated in FIG. 1.

Processor 505 may also be operatively coupled to a storage device 525. For example, storage device 525 may be used to implement database 110 (shown in FIG. 1). Storage device 525 is any computer-operated hardware suitable for storing and/or retrieving data. In some embodiments, storage device 525 is integrated in server system 501. For example, server system 501 may include one or more hard disk drives as storage device 525. In other embodiments, storage device 525 is external to server system 501 and may be accessed by a plurality of server systems 501. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 is operatively coupled to storage device 525 via a storage interface 520. Storage interface 520 is any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 525.

Memory area 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
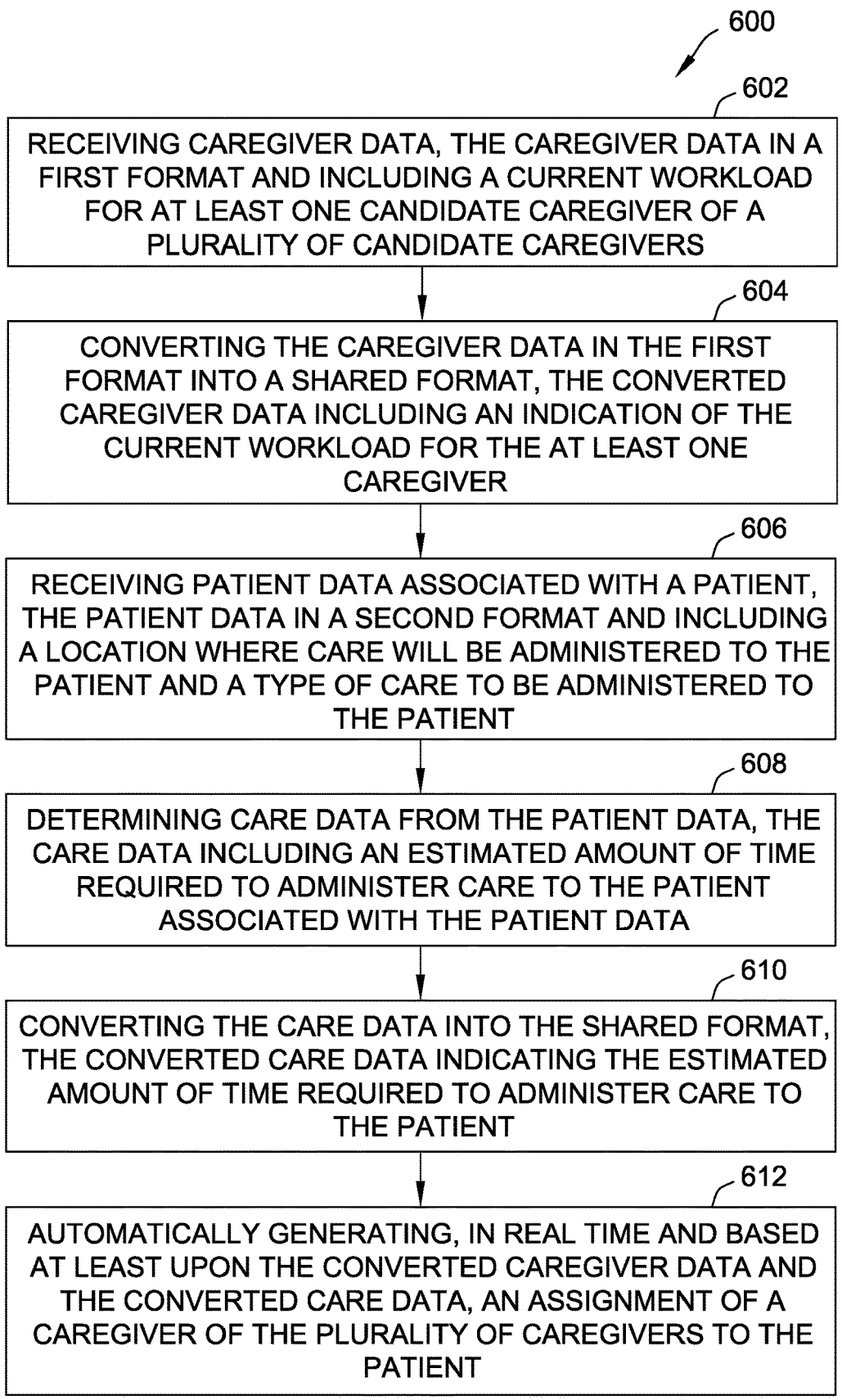

FIG. 6 is an example flow chart of an example method 600 for assigning at least one caregiver to at least one patient in accordance with the present disclosure. Method 600 includes receiving 602, at a processor (e.g., processor 505), caregiver data (e.g., caregiver data 204), the caregiver data in a first format and including a current workload for at least one candidate caregiver of a plurality of candidate caregivers and converting 604 the caregiver data in the first format into a shared format, the converted caregiver data including an indication of the current workload for the at least one caregiver. In some embodiments, the current workload for the at least one candidate caregiver includes a number of patients assigned to the at least one candidate caregiver and an amount of time required to administer care to the patients assigned to the at least one candidate caregiver.

Method 600 also includes receiving 606 patient data (e.g., patient data 202) associated with a patient, the patient data in a second format and including a location where care will be administered to the patient and a type of care to be administered to the patient, determining 608 care data from the patient data, the care data including an estimated amount of time required to administer care to the patient associated with the patient data, and converting 610 the care data into the shared format, the converted care data indicating the estimated amount of time required to administer care to the patient. In some embodiments, converting 610 the care data includes converting the care data into the shared format to generate a patient score, wherein the converted care data includes a number on a predetermined scale that represents the estimated of an amount of time that will be required for a caregiver to provide care to a patient associated with the patient score.

Method 600 further includes automatically generating 612, in real time and based at least upon the converted caregiver data and the converted care data, an assignment of a caregiver of the plurality of caregivers to the patient. In some embodiments, automatically generating 612 the assignment of the caregiver includes determining at least one candidate caregiver based on an amount of travel time required for the at least one candidate caregiver to travel to the location where care will be administered to the patient. In some embodiments automatically generating 612 the assignment of the caregiver includes determining at least one candidate caregiver based on at least one caregiver qualification requirement. In some embodiments, automatically generating 612 the assignment of the caregiver includes determining at least one candidate caregiver based on at least a spoken language requirement and/or a medical certification requirement.

Figure 7:
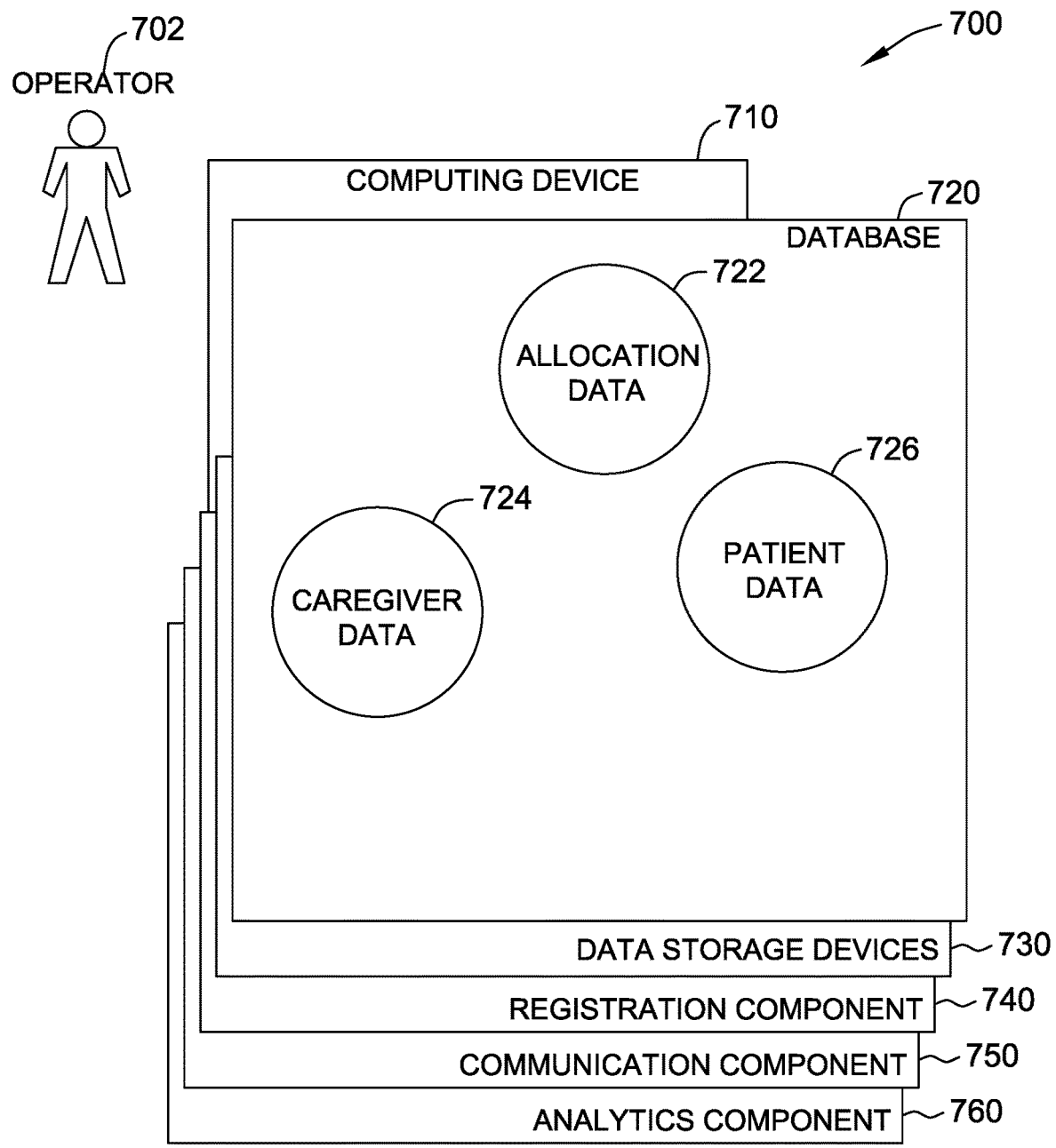

FIG. 7 is a diagram 700 of computer components of one or more example computing devices 710 that may be used in CA computing system 100, as shown in FIG. 1. In some embodiments, computing device 710 is used to implement CA computing device 102 (shown in FIG. 1). The computer components may be used to allocate and assign caregivers to patients, as is described above in regard to CA computing device 102 (shown in FIG. 1). Operator 702 (such as a user operating CA device 102) may access computing device 710 in order to service computing device 710.

Computing device 710 includes database 720, as well as storage devices 730, for storing data within database 720. In some embodiments, database 720 is similar to database 110 (as shown in FIG. 1). Database 720 may be coupled with several separate components within computing device 710, which perform specific tasks. In the example embodiment, database 720 includes allocation data 722, including allocations of caregivers to patients, caregiver data 724, and/or patient data 726.

Computing device 710 also includes registration component 740 for registering a user with CA computing system 100 using registration data received from, for example, case manager computing device 104, patient computing device 106, and/or caregiver computing device 108. Computing device 710 further includes communications component 750 configured for, for example, receiving patient data 202, caregiver data 204, and/or allocation request data 206, and for sending patient data 202, caregiver data 204, patient and caregiver data request 208, proposed allocation plan 212, and final allocation plan 214 as shown in FIG. 2.

Computing device 710 further includes analytics component 760 for, as an example, determining an allocation plan including assignment of at least one caregiver to at least one patient.

CA computing system 100 may utilize a variety of algorithms in determining recommendations regarding assigning caregivers to patients. With the ultimate goal of providing recommendations regarding assigning caregivers to patients, CA computing system 100 provides a number of benefits, as described herein. For example, utilization of CA computing system 100 results in reducing travel distance of caregivers (e.g., total distance, max distance, etc.) and ensuring that caregivers and patients speak the same language (e.g., to meet jurisdictional requirements and/or reduce translation costs). Further, CA computing system 100 is configured to recommend patients are assigned to a desired caregiver, when possible, and that skills of caregivers match the needs of the patients they are assigned to. CA computing system 100 also ensures that caregiver workloads are balanced and, in some embodiments, do not exceed a defined limit (e.g., defined by one or more users of CA computing system 100 and/or CA computing system 100 itself). CA computing system 100 also provides case managers and caregivers enough flexibility to modify certain recommended assignments (e.g., by customizing plans generated by CA computing system 100) in order to better serve case manager/caregiver preferences.

In some embodiments, CA computing system 100 may utilize linear programming optimization techniques in order to optimize (e.g., minimize) costs when assigning caregivers to patients. For example, the "cost" of assigning a particular caregiver to a particular patient may include the sum of distance cost (e.g., cost for caregiver to travel to patient) and translation cost (e.g., translation costs when the caregiver provides care to the patient). However, several other factors may also be considered by CA computing system 100 when assigning caregivers to patients (e.g., caregiver workload).

In assigning caregivers to patients, at any given time, either a patient is assigned to a caregiver, or they are not. For example, the following equation (e.g., objective function) may be utilized in assigning caregivers to patients:

$$\min f(x) = \sum_{i \in M, j \in C} d_{ij} x_{ij} + \sum_{i \in M, j \in C} t_{ij} x_{ij} + \cdots$$

wherein $x_{ij}=1$ if patient (member, or "M") i is assigned to caregiver (case manager, or "C") j and xij=0 if patient i is not assigned to caregiver j:

$x_{ij} \in \{0,1\}$, I∈M, J∈C

CA computing system 100 assigns all the patients in a way that minimizes the objective function. In the example embodiment, the coefficients dij and tij represent the distance cost and translation costs, respectively, of assigning member i to manager j. Further, as indicated by " . . . " in the above equation, any number of factors may be considered when assigning caregivers to patients (e.g., including but not limited to distance cost and translation cost, as defined above).

Further, caregiver workload may be considered by CA computing system 100 in the example embodiment. When considering caregiver workload, the following equation may be utilized:

$$\sum_{i \in M} w_i x_{ij} \leq b_j \forall j \in C$$

wherein wi is the workload/weight of patient i (e.g., patient score indicating amount of time predicted to provide care to the patient) and bj is the maximum capacity/workload of caregiver j. Further, each patient may only be assigned to a single caregiver at any time, which may be expressed by the following equation:

$$\sum_{j \in C} x_{ij} \leq 1 \forall i \in M$$

The elements of X are variables and that can take on one of two values. Therefore, 2^mn possible solutions exist and a brute force approach is not feasible (For PA, that would be 2^[(25,000)(200)]=2^(5,000,000), which is beyond astronomically large as the age of the universe in seconds is ~2^59 and the estimated number of atoms in the universe is ~2^266). Such is the problem of combinatorial optimization problems. Since each of the variables must take on one of two integer values, CA computing system 100 may utilize integer programming techniques such as Integer Linear Programming (ILP) (Integer because CA computing system 100 may account for factors that must take on integer values, and linear because the objective function and non-integer constraints are linear). In some embodiments, CA computing system 100 may not use normal/traditional methods for solving linear programs because the integer constrained solutions might not necessarily lie on the boundaries of the feasible region as is the case in linear programming. For ILP problems, a branch and bound algorithm may be a particularly efficient.

Accordingly, in some embodiments, CA computing system 100 may utilize a Branch and Bound (BnB) algorithm by recursively dividing a problem into smaller and smaller sub-problems until a solution is found that meets the constraints of the problem or is infeasible (outside of system constraints).

While it is easier to solve smaller problems, simply dividing each space into smaller spaces until it is just a single solution is essentially doing the brute force approach. CA computing system 100 combines approaches by finding the optimal solution to all of the non-integer constraints (in this example being none). If the optimal solution to the subproblem is worse (e.g., more costly, time-consuming, etc.) than the best integer solution found so far, CA computing system 100 does not need to divide that subproblem any further.

Figure 8:
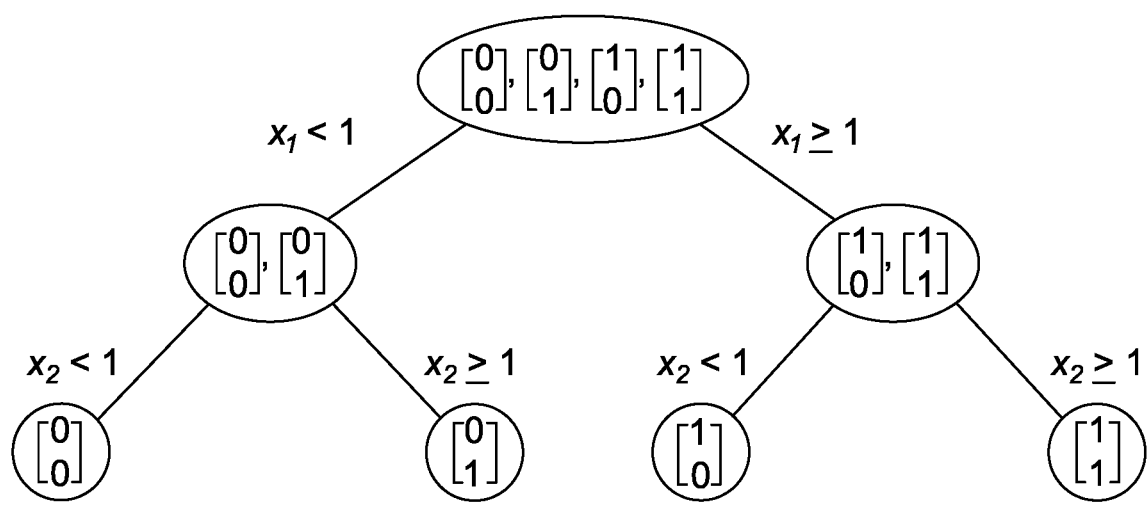

In one example, say the problem tree shown in FIG. 8 is provided. CA computing system 100 analyzes the x1>1 subproblem first and determines that [1, 1]' is the best solution for that subproblem. When CA computing system 100 analyzes the x1<1 subproblem, CA computing system 100 determines that there are no solutions within its domain that are better than [1, 1]' and therefore CA computing system 100 does not need to divide it along x2. Essentially, CA computing system 100 prunes the tree shown in FIG. 8 and bounds the problem statement by not analyzing the entire input variable space for individual solutions by discounting subspaces that CA computing system 100 determines are no better than a current best solution. Accordingly, computational resources are saved and computational efficiency is increased by CA computing system 100 assigning caregivers to patients according to the systems and methods described herein.

The computer-implemented methods discussed herein may include additional, less, or alternate actions, including those discussed elsewhere herein. The methods may be implemented via one or more local or remote processors, transceivers, servers, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, statistics and information, and/or historical data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As described above, the systems and methods described herein may use machine learning, for example, for pattern recognition. That is, machine learning algorithms may be used by CA computing system 100 to attempt to identify patterns regarding optimizing assigning caregivers to patients. Accordingly, the systems and methods described herein may use machine learning algorithms for both pattern recognition and predictive modeling (e.g., based upon data regarding modified patient scores over time). As an example, CA computing system 100 may utilize machine learning techniques in determining weights for a plurality of factors (e.g., health factors, spoken language, certifications required, etc.) when determining a patient score, as described herein.

Further, CA computing device 102 may train a model according to a plurality of data sets (e.g., travel time required for a caregiver to meet a patient and time required for the caregiver to administer care to the patient). For example, CA computing device 102 may train a model over time to adjust certain patient scores (e.g., because of greater or less determined travel time and/or time required to administer care to a patient), and generate at least one new optimal caregiver assignment based upon the trained model (e.g., in real time in response to receipt of new data and training in response thereto). Data utilized by CA computing device 102 to train a model may include more or less data than described herein (e.g., for example any number of data sets may be utilized to train the model). In addition to modifying caregiver assignments to patients over time, CA computing device 102 may utilize the trained model in assigning caregivers to new patients (e.g., by utilizing the trained model, instead of data initially inputted to the system, CA computing device 102 may more efficiently assign caregivers to patients). In other words, CA computing device 102 may train the model over time such that the model accounts for certain routes and/or times of travel being more or less than previously predicted by the system/model, and/or certain types of care requiring more or less treatment time than previously predicted by the system/model.

In some embodiments, CA computing device 102 may provide outputs in real time in order to further optimize assigning caregivers to patients. For example, CA computing device 102 may output to a caregiver computing device 108, a schedule for the day wherein the schedule includes at least the patients the caregiver is assigned to on that particular day (and/or any other time period) and the times at which the caregiver should be treating the patients. CA computing device 102 may further provide navigational tools to caregiver computing device 108 such that the caregiver can more efficiently travel from patient to patient (e.g., CA computing device 102 may monitor certain traffic events (e.g., as received from a third party system) in order to route caregivers around traffic events that may delay the caregiver arriving to a particular location).

In some embodiments, CA computing device 102 may provide outputs to patient computing device 106 in order to notify a patient of the travel status of a caregiver (e.g., an estimated arrival time). For example, CA computing device 102 may notify a patient (e.g., by transmission of data to patient computing device 106) of a time a caregiver is scheduled to provide care to the patient and/or a location at which the care is to be provided. CA computing device 102 may also notify the patient of a time when the caregiver is en route to the appointment, when the caregiver has almost arrived to the appointment (e.g., when the caregiver is 5 minutes away), and/or when the caregiver has arrived at the appointment location. In some embodiments CA computing device 102 may provide a real time map to patient computing device 106 such that the patient can view, at patient computing device 106, an approximate location of their assigned caregiver (e.g., location at a particular intersection, on a particular road, etc.).

In some embodiments, CA computing device 102 may monitor caregivers (e.g., via caregiver computing device 108) and may determine that a particular caregiver is running behind schedule. For example, CA computing device 102 may track the location of caregiver computing device 108 and determine that a caregiver arrived at a most-recent appointment an hour late. In order to optimize assigning caregivers to patients, CA computing device 102 may recommend (e.g., to case manager computing device 108 and/or patient computing device 106) a modification to the caregiver schedule and/or automatically modify the caregiver schedule. In other words, CA computing device 102 may reassign caregivers to one or more appointments the caregiver who is running late is assigned to for that particular day. In some embodiments, CA computing device 102 may require authorization from case manager computing device 104 and/or patient computing device 106 in order to modify one or more caregiver schedules. As another example, if a particular caregiver is consistently late to a particular appointment, CA computing device 102 may utilize artificial intelligence techniques (e.g., as described above) in order to train a model according to whether the caregiver is arriving late because of travel time and/or time required to administer care to patients earlier in their schedule.

In some embodiments, CA computing device 102 may be configured to utilize heuristic techniques in optimization of assigning caregivers to patients. For example, CA computing device 102 may operate a heuristic technique in two phases: unfitness (e.g., for each violated constraint (e.g., workload, certifications, etc.)), a heuristic tries to reassign jobs from one over-capacity caregiver to another under-capacity caregiver and fitness (e.g., assignments are reassigned to caregivers in an attempt to reduce cost without violating additional constraints/factors as described herein). For example, CA computing device 102 may be configured to continually (or at predetermined/predefined times e.g., as set by a case manager), in order to optimize assigning caregivers to patients, provisionally replace/modify patient to caregiver assignments and recommend new assignments (e.g., to a case manager). Accordingly, CA computing device 102 may be utilized, via any of the techniques described herein, to continuously and in real-time provisionally recommend new assignments of caregivers to patients (e.g., a case manager may need to approve a new assignment before it is implemented) and/or automatically implement new assignments of caregivers to patients.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of CA computing device 102 are described herein as including general processing and memory devices, it should be understood that CA computing device 102 is a specialized computer configured to perform the steps described herein for effectively and efficiently assigning caregivers to patients.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A caregiver assignment (CA) computing system for assigning at least one caregiver to at least one patient, the CA computing system including at least one processor coupled to a database, the at least one processor configured to:
   receive caregiver data, the caregiver data in a first format and including a current workload for a plurality of candidate caregivers;
   convert the caregiver data in the first format into a shared format, the converted caregiver data including an indication of the current workload for the plurality of candidate caregivers;
   receive patient data associated with a patient, the patient data in a second format and including a location where care will be administered to the patient and a type of care to be administered to the patient;
   determine care data from the patient data, the care data including patient medical information associated with care administration for the patient;
   input the care data into a trained machine learning model, wherein the trained machine learning model is trained based upon historical care data to generate outputs in the shared format that indicate estimated amounts of time to administer care to patients;
   receive converted care data in the shared format in an output from the trained machine learning model;
   determine an estimated amount of time required to administer care to the patient based upon the output from the trained machine learning model;
   determine a predefined workload capacity for the plurality of candidate caregivers;
   determine a portion of the plurality of candidate caregivers whose current workload, with an addition of the estimated amount of time required to administer care to the patient, would not exceed the predefined workload capacity;

automatically generate, based at least upon the converted caregiver data and the converted care data, an assignment of a caregiver of the portion of the plurality of candidate caregivers to the patient in real time;

automatically generate at least one reassignment of at least one other patient to at least one other caregiver based at least upon the assignment of the caregiver to the patient in real time; and automatically transmit notifications associated with at least one of the assignment and the reassignment to all computing devices participating in a computer network in real time, all of the computing devices comprising a first computing device associated with the caregiver and a second at least one computing device associated with the at least one other caregiver, so that each of the caregiver and the at least one other caregiver have immediate access to up-to-date assignment information.

2. The CA computing system of claim 1, wherein the at least one processor is further configured to determine the assignment of the caregiver based on at least one of an amount of travel time required for the portion of the plurality of candidate caregivers to travel to the location where care will be administered to the patient and an amount of travel distance required for the portion of the plurality of candidate caregivers to travel to the location where care will be administered to the patient.

3. The CA computing system of claim 1, wherein the at least one processor is further configured to determine the assignment of the caregiver based on at least one caregiver qualification requirement, wherein the at least one caregiver qualification requirement includes at least one of a spoken language requirement and a medical certification requirement.

4. The CA computing system of claim 1, wherein the at least one processor is further configured to determine, based at least in part upon the caregiver data, when hiring one or more new caregivers is required, and generating a recommended profile of the one or more new caregivers to fit patient needs.

5. The CA computing system of claim 1, wherein the converted care data comprises a number on a predetermined scale that represents the estimated amount of time that will be required for care to be provided to the patient.

6. The CA computing system of claim 1, wherein the current workload for the plurality of candidate caregivers includes a number of patients assigned to the plurality of candidate caregivers and an amount of time required to administer care to the patients assigned to the plurality of candidate caregivers.

7. The CA computing system of claim 1, wherein the at least one processor is further configured to train the trained machine learning model over time based upon the pluralities of care data associated with the pluralities of patients.

8. The CA computing system of claim 1, wherein all of the computing devices further comprise additional computing devices associated with the patient and the at least one other patient so that each of the caregiver, the at least one other caregiver, the patient, and the at least one other patient have immediate access to the up-to-date assignment information.

9. A computer-implemented method for assigning at least one caregiver to at least one patient, the method implemented by at least one caregiver allocation (CA) computing device including at least one processor in communication with a database, the method comprising:

receiving caregiver data, the caregiver data in a first format and including a current workload for a plurality of candidate caregivers;

converting the caregiver data in the first format into a shared format, the converted caregiver data including an indication of the current workload for the plurality of candidate caregivers;

receiving patient data associated with a patient, the patient data in a second format and including a location where care will be administered to the patient and a type of care to be administered to the patient;

determining care data from the patient data, the care data including patient medical information associated with care administration for the patient;

inputting the care data into a trained machine learning model, wherein the trained machine learning model is trained based upon historical care data to generate outputs in the shared format that indicate estimated amounts of time to administer care to patients;

receiving converted care data in the shared format in an output from the trained machine learning model;

determining an estimated amount of time required to administer care to the patient based upon the output from the trained machine learning model;

determining a predefined workload capacity for the plurality of candidate caregivers;

determining a portion of the plurality of candidate caregivers whose current workload, with an addition of the estimated amount of time required to administer care to the patient, would not exceed the predefined workload capacity; and automatically generating, based at least upon the converted caregiver data and the converted care data, an assignment of a caregiver of the portion of the plurality of candidate caregivers to the patient in real time;

automatically generating at least one reassignment of at least one other patient to at least one other caregiver based at least upon the assignment of the caregiver to the patient in real time; and automatically transmitting notifications associated with at least one of the assignment and the reassignment to all computing devices participating in a computer network in real time, all of the computing devices comprising a first computing device associated with the caregiver and a second at least one computing device associated with the at least one other caregiver, so that each of the caregiver and the at least one other caregiver have immediate access to up-to-date assignment information.

10. The method of claim 9, further comprising determining the assignment of the caregiver based on at least one of an amount of travel time required for the portion of the plurality of candidate caregivers to travel to the location where care will be administered to the patient and an amount of travel distance required for the portion of the plurality of candidate caregivers to travel to the location where care will be administered to the patient.

11. The method of claim 9, further comprising determining, based at least in part upon the caregiver data, when hiring one or more new caregivers is required, and generating a recommended profile of the one or more new caregivers to fit patient needs.

12. The method of claim 9, wherein the converted care data comprises a number on a predetermined scale that represents the estimated amount of time that will be required for care to be provided to the patient.

13. The method of claim 9, wherein the current workload for the plurality of candidate caregivers includes a number of patients assigned to the plurality of candidate caregivers and an amount of time required to administer care to the patients assigned to the plurality of candidate caregivers.

14. A non-transitory computer-readable storage media having computer-executable instructions stored thereon that, when executed by at least one processor in communication with at least one memory device, cause the at least one processor to:
receive caregiver data, the caregiver data in a first format and including a current workload for a plurality of candidate caregivers;
convert the caregiver data in the first format into a shared format, the converted caregiver data including an indication of the current workload for the plurality of candidate caregivers;
receive patient data associated with a patient, the patient data in a second format and including a location where care will be administered to the patient and a type of care to be administered to the patient;
determine care data from the patient data, the care data including patient medical information associated with care administration for the patient;
input the care data into a trained machine learning model, wherein the trained machine learning model is trained based upon historical care data to generate outputs in the shared format that indicate estimated amounts of time to administer care to patients;
receive converted care data in the shared format in an output from the trained machine learning model;
determine an estimated amount of time required to administer care to the patient based upon the output from the trained machine learning model;
determine a predefined workload capacity for the plurality of candidate caregivers;
determine a portion of the plurality of candidate caregivers whose current workload, with an addition of the estimated amount of time required to administer care to the patient, would not exceed the predefined workload capacity; and
automatically generate, based at least upon the converted caregiver data and the converted care data, an assignment of a caregiver of the portion of the plurality of candidate caregivers to the patient in real time;
automatically generate at least one reassignment of at least one other patient to at least one other caregiver based at least upon the assignment of the caregiver to the patient in real time; and
automatically transmit notifications associated with at least one of the assignment and the reassignment to all computing devices participating in a computer network in real time, all of the computing devices comprising a first computing device associated with the caregiver and a second at least one computing device associated with the at least one other caregiver, so that each of the caregiver and the at least one other caregiver have immediate access to up-to-date assignment information.

15. The non-transitory computer-readable storage media of claim 14, wherein the instructions further cause the at least one processor determine the assignment of the caregiver based on at least one of an amount of travel time required for the portion of the plurality of candidate caregivers to travel to the location where care will be administered to the patient and an amount of travel distance required for the portion of the plurality of candidate caregivers to travel to the location where care will be administered to the patient.

16. The non-transitory computer-readable storage media of claim 14, wherein the instructions further cause the at least one processor to determine the assignment of the caregiver based on at least one caregiver qualification requirement, wherein the at least one caregiver qualification requirement includes at least one of a spoken language requirement and a medical certification requirement.

17. The non-transitory computer-readable storage media of claim 14, wherein the instructions further cause the at least one processor to determine, based at least in part upon the caregiver data, when hiring one or more new caregivers is required, and generating a recommended profile of the one or more new caregivers to fit patient needs.

18. The non-transitory computer-readable storage media of claim 14, wherein the converted care data comprises a number on a predetermined scale that represents the estimated amount of time that will be required for care to be provided to the patient.

* * * * *